US012644521B2

(12) United States Patent (10) Patent No.: US 12,644,521 B2
Formisano et al. (45) Date of Patent: Jun. 2, 2026

(54) SEALING ELEMENT AND MANUFACTURING PROCESS

(71) Applicants: ElringKlinger Kunststofftechnik GmbH, Bietigheim-Bissingen (DE); ELRINGKLINGER AG, Dettingen/Erms (DE)

(72) Inventors: Benjamino Rocco Formisano, Dettingen/Erms (DE); Ardijan Halili, Dettingen/Erms (DE); Harald Schober, Dettingen/Erms (DE)

(73) Assignees: ELRINGKLINGER KUNSTSTOFFTECHNIK GMBH, Bietigheim-Bissingen (DE); ELRINGKLINGER AG, Dettingen/Erms (DE)

( * ) Notice: Subject to any disclaimer, the term of this patent is extended or adjusted under 35 U.S.C. 154(b) by 0 days.

(21) Appl. No.: 18/694,141

(22) PCT Filed: Sep. 23, 2022

(86) PCT No.: PCT/EP2022/076599
§ 371 (c)(1),
(2) Date: Mar. 21, 2024

(87) PCT Pub. No.: WO2023/046935
PCT Pub. Date: Mar. 30, 2023

(65) Prior Publication Data
US 2024/0418266 A1 Dec. 19, 2024

(30) Foreign Application Priority Data
Sep. 23, 2021 (DE) .......................... 102021124707.1

(51) Int. Cl.
*F16J 15/32* (2016.01)
*F16J 15/328* (2016.01)
(Continued)

(52) U.S. Cl.
CPC ......... *F16J 15/328* (2013.01); *F16J 15/3284* (2013.01); *B29C 45/37* (2013.01); *B29K 2021/003* (2013.01); *B29L 2031/26* (2013.01)

(58) Field of Classification Search
CPC .... F16J 15/3244; F16J 15/3268; F16J 15/328; F16J 15/3284
See application file for complete search history.

(56) References Cited

U.S. PATENT DOCUMENTS 5,664,651 A * 9/1997 Miura ..................... F16F 9/363
277/565
5,730,420 A 3/1998 Tow
(Continued)

FOREIGN PATENT DOCUMENTS

DE 2548967 A1 5/1976
DE 2818935 A1 11/1978
(Continued)

OTHER PUBLICATIONS

International Search Report & Written Opinion for PCT Application No. PCT/EP2022/076599, mailed Mar. 30, 2023, 11 pages.

*Primary Examiner* — Christine M Mills
*Assistant Examiner* — L. Susmitha Koneru

(57) ABSTRACT

A sealing element made of a plastic, which is embodied to seal against an actuator and consists of a plastic or resin that can be handled in an injection molding process. In order to significantly improve a sealing tightness of injection molded sealing elements made of a plastic, according to the invention the sealing element, as a direct product of an injection molding process, is provided with a structure in the form of a groove in the sealing surface, which groove is distributed over the periphery of the sealing surface.

9 Claims, 3 Drawing Sheets

(51) Int. Cl.
| | |
|---|---|
| *F16J 15/3284* | (2016.01) |
| *B29C 45/37* | (2006.01) |
| *B29K 21/00* | (2006.01) |
| *B29L 31/26* | (2006.01) |

(56) References Cited

U.S. PATENT DOCUMENTS

| | | | |
|---|---|---|---|
| 10,145,474 B2 * | 12/2018 | Schuhmacher ...... | F16J 15/3208 |
| 10,774,932 B2 * | 9/2020 | Hocker ................... | F16L 33/30 |
| 2013/0264776 A1 * | 10/2013 | Kurth ................... | F16J 15/3244 |
| | | | 277/549 |
| 2017/0219099 A1 * | 8/2017 | Schuhmacher ...... | F16J 15/3208 |
| 2017/0261104 A1 * | 9/2017 | Hocker ................... | F16J 15/56 |
| 2017/0261106 A1 * | 9/2017 | Hocker ................ | F16L 11/121 |
| 2021/0341059 A1 * | 11/2021 | Hocker ................... | F16L 33/30 |

FOREIGN PATENT DOCUMENTS

| | | |
|---|---|---|
| DE | 3420522 A1 | 12/1985 |
| DE | 19904862 C1 | 1/2001 |
| DE | 102006004945 A1 | 8/2006 |
| EP | 3553355 A1 | 10/2019 |
| JP | 2016138641 A | 8/2016 |

* cited by examiner 0.10 mm 0.10 mm

SEALING ELEMENT AND MANUFACTURING PROCESS

FIELD OF THE INVENTION

The present invention relates to a sealing element, which is embodied to seal against a movable actuator and consists of a plastic or resin that can be handled in an injection molding process, and to a manufacturing process for such a sealing element.

BACKGROUND OF THE INVENTION

Sealing elements of the above-mentioned type are used not only with flat actuators, but also with spherical, conical, or roller-shaped actuators, e.g. for sealing various fluid ducts in a thermal management module. Thermal management modules control and regulate a distribution of a cooling or heating liquid in a thermal circuit that can be adjusted by means of the actuator. A sample, but non-exclusive use of such thermal management modules is a coolant circuit in an automobile. An opening and closing of a flow channel in such a thermal management module usually takes place by means of an either spherical or roller-shaped actuator with at least one flow opening in sealing contact with a sealing element.

Such sealing elements can be manufactured by the machining of a semifinished product or by means of injection molding. Particularly in mass production, the latter process of injection molding a plastic has a cost advantage compared to the former process, i.e. a machining of a semifinished product made of plastic. Tests, however, have shown that compared to a sealing element manufactured by machining, an injection molded one exhibits significantly higher leakage and a high degree of scatter in the sealing behavior. For these reasons, only sealing elements manufactured by machining are currently used in the above-mentioned application field.

The object of the present invention is to significantly improve the tightness of injection molded sealing elements manufactured out of a plastic and also to disclose a manufacturing process.

SUMMARY OF THE INVENTION

A sealing element that is embodied according to the invention, as a direct product of an injection molding process, is provided with a structure in the form of at least one groove in a sealing surface, which groove is distributed over a periphery of the sealing surface.

An embodiment of a sealing element according to the invention is based on the knowledge that, compared to injection-molded parts made of the same material, spherical seals made of a thermoplastic material and produced by means of machining have a grooved surface structure that cannot—or can hardly—be avoided by the machining and extends over the periphery of the sealing surface. A grooved surface acts like a huge number of sealing lips. The presence of these sealing lips significantly reduces a number of leakage paths in comparison to a conventional injection molded surface since a surface of an injection molded part generally has a structure with a rather randomly nubbed structure. With a structure in the form of at least one groove distributed over a periphery of the sealing surface, a sealing element according to the invention, also as a product of an injection molding process without any finishing work—in particular by means of a machining of the surface that is more time-consuming and more expensive for this reason alone—already has a sealing behavior that essentially corresponds to that of sealing elements manufactured by means of a machining of a plastic semifinished product. The embodiment of at least one groove distributed over the periphery of the sealing surface, which can basically be any shape, takes place in the course of the injection molding process in situ on the sealing element being produced, without an additional process step being required for this purpose.

The stated object is also attained by means of a process for manufacturing a sealing element using an injection molding tool in which a negative structuring has been provided to form a sealing surface with a grooved surface structure. The groove structure is produced on each injection molded part without any finishing step.

According to some embodiments, the surface of the sealing surface has a structure with a closed groove structure. Such a groove structure on the surface essentially corresponds to that of a sealing element manufactured by machining, which thus achieves its function in the form of thin, multiple sealing lips and achieves a comparatively higher degree of tightness than a known injection molded part. These groove structures generally constitute closed structures of thin sealing lips in close proximity to one another.

In a particularly preferred embodiment, the structure in the sealing surface is embodied as a microstructure, i.e. a structure according to the invention that is characterized by very small dimensions. In advantageous exemplary embodiments of the invention, instead of precise dimensions, an axial surface roughness throughout a groove structure is therefore disclosed, which is characterized by means of an average roughness value $Ra < 2$ $\mu m$ or a lower limit of an average roughness depth $Rz < 5$ $\mu m$.

In a preferred embodiment of the invention, the average roughness value is $Ra < 1$ $\mu m$ or a lower limit of an average roughness depth is $Rz < 2$ $\mu m$.

It is thus possible to handle all plastics that can be handled by means of an injection molding process, i.e. also including cross-linkable materials whose shape is produced by means of injection molding. Preferably, however, a thermoplastic material is provided as the plastic. Particularly preferably, a fluoroplastic is provided as the thermoplastic material since very demanding applications, in addition to the respectively required tightness, also require a low friction with the resulting small adjusting forces. Such low coefficients of friction can be advantageously achieved through the use of fluoroplastics as the sealing material.

In an injection molding tool, a sealing surface that is to be provided with a surface structure on a sealing element, which is to be manufactured, a groove structure is produced by means of erosion, etching, or lasers. To produce the surface structures, however, basically any process can be used, so long as a correspondingly fine structuring can be achieved in a controlled way. This surface structure is similar to that of sealing elements manufactured by machining. In addition to an inexpensive production of sealing elements, however, this approach also makes it possible to design improved seals for geometries and spatial shapes of sealing surfaces that cannot be manufactured or can only be manufactured at great expense by means of machining, e.g. a sealing element with a rectangular flow geometry. Non-radially symmetrical structures are of interest in all cases in which the seal itself and/or the installation space is not round or radially symmetrical. Now for the first time, sealing elements for this purpose with significantly improved sealing properties can be manufactured by means of a process according to the invention.

BRIEF DESCRIPTION OF THE DRAWINGS

Other features and advantages of embodiments according to the invention will be explained in greater detail below with reference to an exemplary embodiment with the aid of the drawings. In the partially simplified depictions in the drawings.

DETAILED DESCRIPTION OF THE INVENTION

Throughout the various depictions of the drawings, the same reference symbols are always used for the same elements or process steps. Without limitation to the invention, a manufacturing process will be described below based on a radially symmetrical sealing element for use in a ball valve. A manufacturing process according to the invention is advantageously not limited to radially symmetrical sealing elements. In particular, it is also possible to achieve rectangular sealing surfaces with an improved tightness by means of a grooved surface structure.

Figure 1:
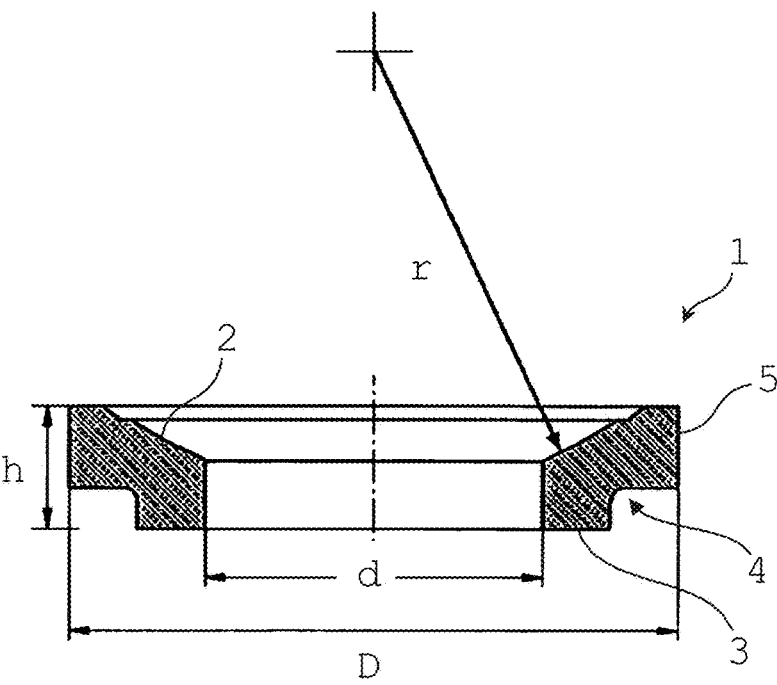
FIG. 1: shows a cross-sectional view of a sealing element in the form of a sealing ring.

FIG. 1 shows a cross-sectional depiction of a sealing element 1 in the form of a sealing ring with a height h, an inner diameter d, and an outer diameter D. A sealing surface 2 of the sealing element 1 forms an annular section of a spherical surface in adaptation to a use for sealing against a spherical actuator with a radius r. On the opposite side from the sealing surface 2, the flat cylindrical sealing element 1 has a support surface 3 with a shoulder 4. A cylindrical circumference surface 5 connects the sealing surface 2 to the shoulder 4.

Figure 2A:
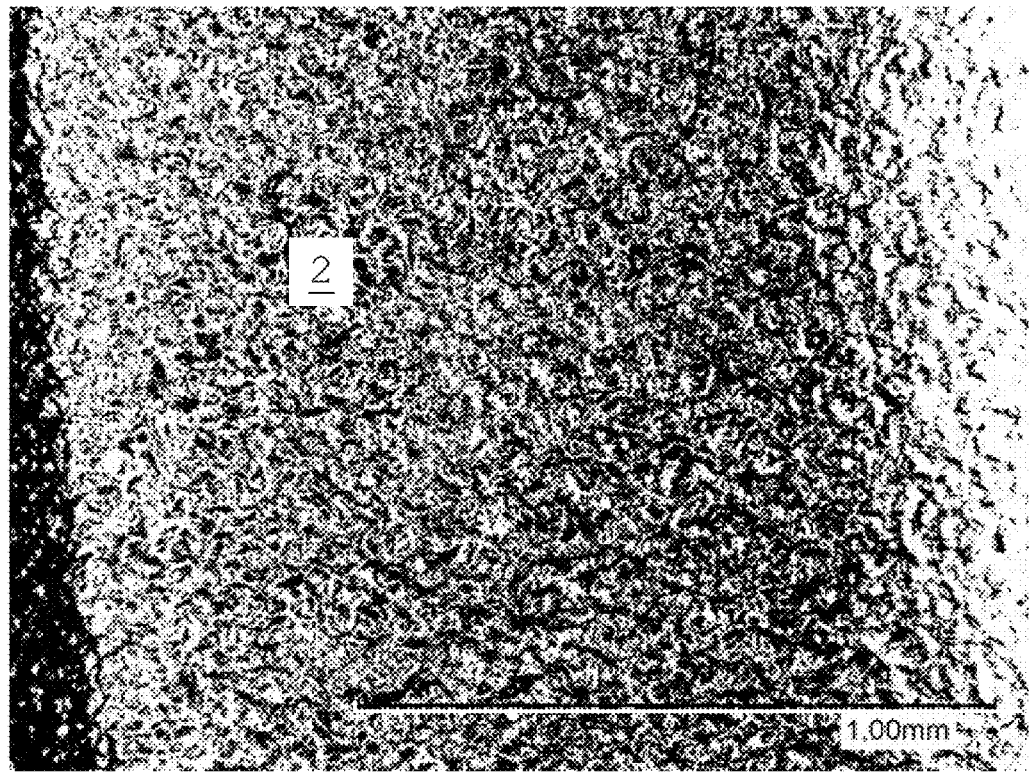
FIGS. 2a to 2c: show enlarged details of a sealing surface manufactured with a known injection molding process and with a process according to the invention as well as a sample measurement of a roughness depth across a section of a sealing surface manufactured with a process according to the invention.

The depiction in FIG. 2a shows an enlarged detail of a sealing surface 2, which has been manufactured in accordance with a known injection molding process. This surface exhibits an irregular structure composed of randomly oriented grain nubs.

Figure 2B:
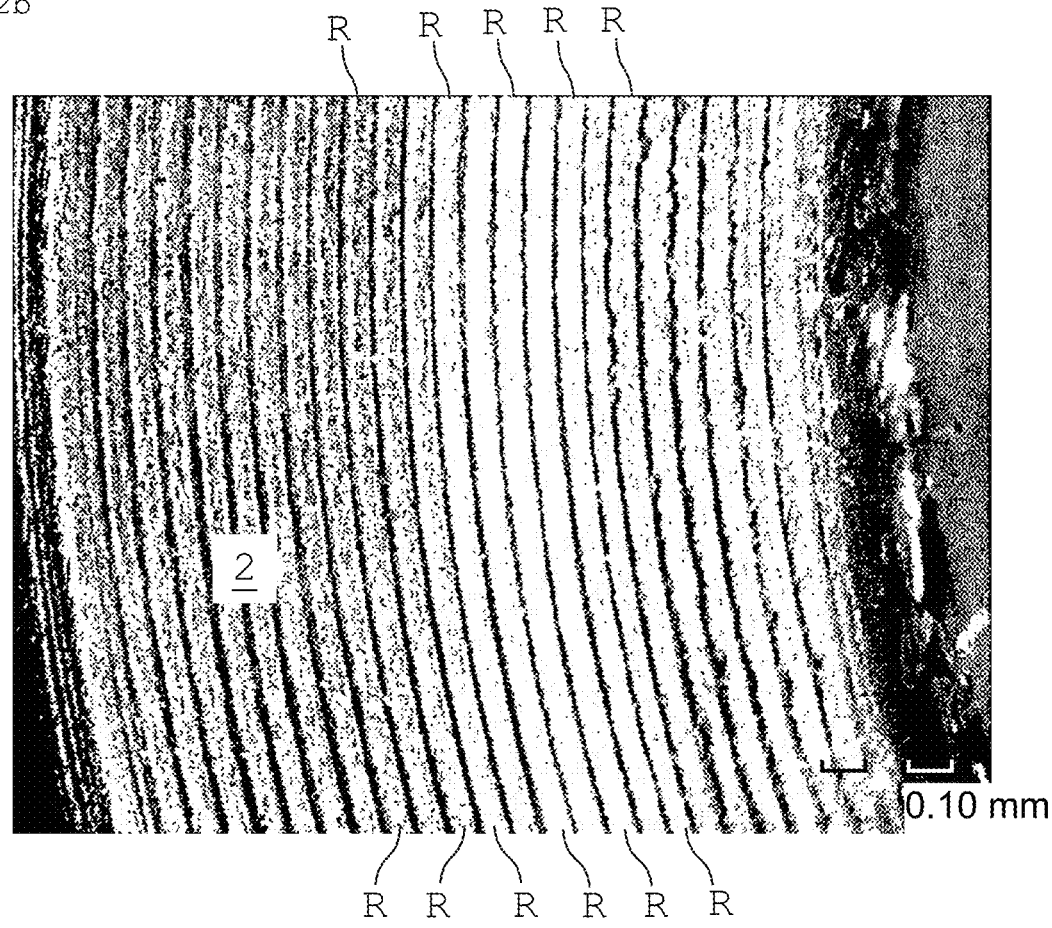

By contrast, the depiction in FIG. 2b shows an enlarged detail of a sealing surface 2 of a sealing element 1, which has been manufactured with an injection molding process according to the invention using an injection molding tool in which a negative structuring has been provided to form a sealing surface 2 with a grooved surface structure. The sealing surface 2 has a surface structure, which exhibits a very uniformly constructed radial groove structure, with sections of one or more grooves R being shown by way of example in FIG. 2b. The maxima or adjacent peaks in this case are spaced apart by less than 0.1 mm or 100 μm.

Figure 2C:
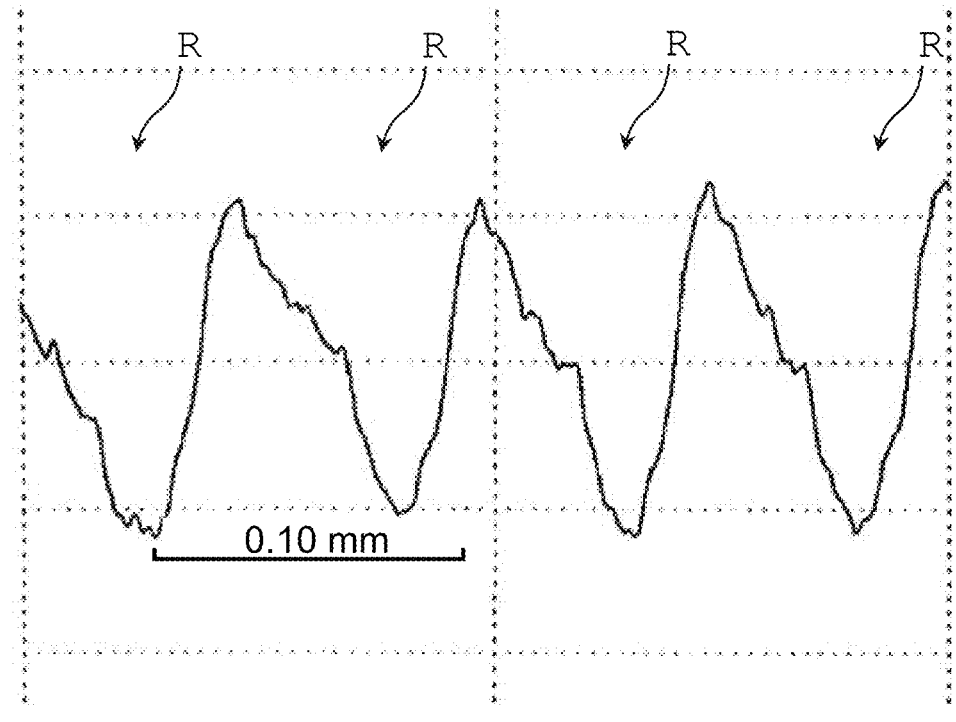

The graph in FIG. 2c shows an even more enlarged sample measurement of a roughness depth over a section of a sealing surface 2 provided with a grooved surface structure, with an approximately regular sequence of essentially identical maxima or peaks and minima or valleys in close proximity to one another as evidence for the microstructure that has been formed over a periphery of the sealing surface 2 of the sealing element 1.

Figures 3, 4:
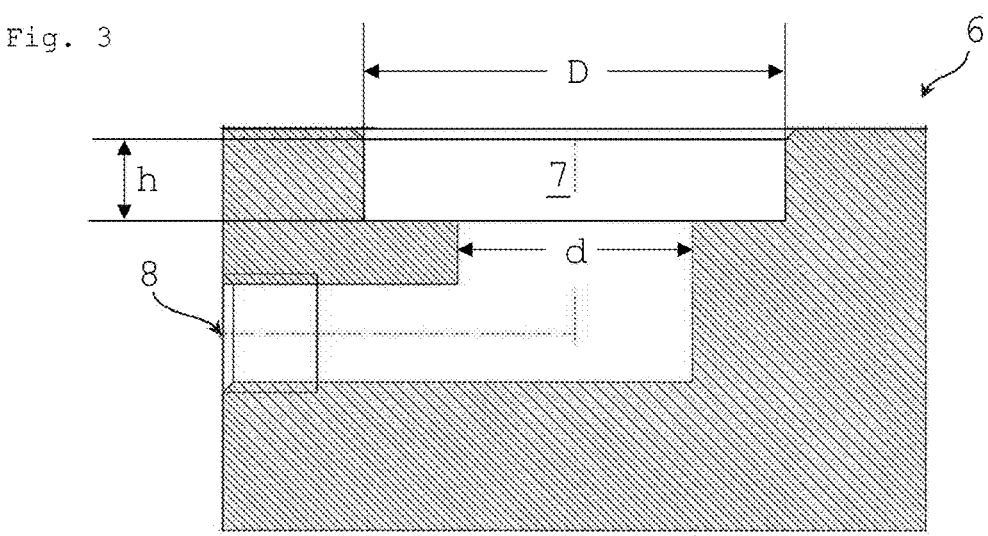
FIG. 3: shows a cross-sectional view of a holder of a sealing element according to FIG. 1, which can also be used in the course of a tightness test.
FIG. 4: shows a cross-sectional view of a measuring device for the tightness test with load application using a sealing element and a holder according to the depictions mentioned above.

FIG. 3 shows a cross-sectional depiction of a holder 6 for a sealing element 1 according to FIG. 1. This holder 6 has a seat 7 with a ground circumferential surface and rounded corners into which the sealing element 1 is inserted. The seat 7 is connected through the holder 6 to a pressure connection 8.

In the following, the holder 6 is used in a measuring device 9 in the course of a tightness test, which is shown in a cross-sectional depiction in FIG. 4. The holder 6 supports the sealing element 1 in the seat 7 with an elastomer O-ring 10 and is positioned in a guide 11 that is closed at the end so that the pressure connection 8 is flush with an opening 12. In this position, a plunger 13 that is supported in the guide 11 and has a hemispherical end with a ground surface presses against the sealing element 1 with an adjustable force F. Then a tightness test is performed by introducing a measurement fluid with an inlet pressure $P_i$ through a port 14 into the guide 11 and then measuring an outlet pressure $P_o$ at the opening 12.

Alternatively, a measurement of the tightness of the sealing element 1 can also be carried out by applying the inlet pressure $P_i$ through a duct 15, which is only indicated with dashed lines, along a central axis M of the plunger 13 and the outlet pressure $P_o$ is present unchanged at the opening 12. The plunger 13 is rotatable around its central axis, as indicated by the arrow. It is thus possible for a tightness at a certain pressing force F to be measured even throughout a full angle. It is thus possible to prove that a sealing element 1 manufactured according to the invention with a radially closed groove structure in the sealing surface 2 itself does not have a preferred angle with a particularly powerful sealing action. This also proves that a sealing element 1 manufactured according to the invention from a thermoplastic fluoroplastic, by means of the particular structuring on a sealing surface 2 that avoids random nubs has an improved tightness regardless of angle since the radially closed groove structure, as a cascade of micro-sealing lips, presents only a comparatively small number of leakage paths. Naturally, other configurations of a pressure measurement via the three possible connections 12, 14, 15 of the above-described measuring device 9—with or without a rotation of the plunger 13—yield the same positive results for a sealing element 1 manufactured according to the invention with a radially closed groove structure in the sealing surface 2.

In comparison to machined parts, injection molded parts have characteristic markings such as ejector marks or injection points. It is therefore possible to identify parts that have been manufactured by means of an injection molding process, even if they have surface structures, which are similar to those of parts manufactured by machining. In order to protect the special surface structure, these characteristic markings can be slightly displaced into a region outside of a respective sealing surface, even though a manufacturing process remains recognizable and detectable.

Thus, according to the present invention, higher-performance and more reliable sealing elements can be produced in a cheaper and faster process with good reproducibility as compared to injection molded parts while adapting to almost any shape of actuator without finishing work and in particular without time-consuming machining. On the contrary, the sealing elements removed from an injection mold can be used immediately and have a significantly improved sealing action.

The invention claimed is:

1. A sealing element that is embodied to seal against an actuator, the sealing element consists of a plastic or resin, which is compatible for use in an injection molding process, wherein, as a direct product of an injection molding process, the sealing element is provided with a structure having at least one groove in a sealing surface, and the groove is distributed over a periphery of the sealing surface, wherein the structure of the sealing surface is a microstructure and an axial surface roughness throughout a groove structure of the sealing surface has an average roughness value Ra<1 µm or a lower limit of an average roughness depth Rz<2 µm.

2. The sealing element according to claim 1, wherein the sealing surface has a structure with closed grooves.

3. The sealing element according to claim 1, wherein the plastic is a thermoplastic material.

4. The sealing element according to claim 3, wherein the thermoplastic material is a fluoroplastic.

5. A process for manufacturing the sealing element according to claim 1, comprising manufacturing the sealing element using an injection molding tool in which a negative structuring has been provided to form a sealing surface with a grooved surface structure.

6. The process according to claim 5, comprising using a thermoplastic material for manufacturing the sealing element.

7. The process according to claim 6, comprising using a fluoroplastic as the thermoplastic material.

8. The process according to claim 5, wherein in the injection molding tool for manufacturing the sealing element, which is to be manufactured with a surface structure on a sealing surface, a groove structure is produced by erosion, etching, or lasers.

9. The sealing element according to claim 1, wherein the sealing surface is spherically formed.

* * * * *